United States Patent [19]

Jonckheere

[11] Patent Number: 4,976,485
[45] Date of Patent: Dec. 11, 1990

[54] TRIBUNE VEHICLE

[76] Inventor: Gilbert R. Jonckheere, Rue de Ménin 408, B - 7700 Mouscron, Belgium

[21] Appl. No.: 439,335

[22] Filed: Nov. 21, 1989

[30] Foreign Application Priority Data

Nov. 22, 1988 [BE] Belgium ............................. 8801316

[51] Int. Cl.$^5$ .............................................. B60P 3/34
[52] U.S. Cl. ...................................... 296/26; 296/182; 296/21; 108/113
[58] Field of Search .................. 296/21, 260, 182, 181; 108/113, 99

[56] References Cited

U.S. PATENT DOCUMENTS

| | | | |
|---|---|---|---|
| 2,755,517 | 7/1956 | Sickel | 296/21 |
| 2,832,637 | 4/1958 | Decosse | 296/26 |
| 2,901,282 | 8/1959 | Meaker | 296/171 |
| 4,019,773 | 4/1977 | Vehling | 296/21 |
| 4,026,076 | 5/1977 | Analetto | 296/26 |
| 4,535,933 | 8/1985 | Kuiper | 296/26 |
| 4,695,087 | 9/1987 | Hollrock | 296/182 |

FOREIGN PATENT DOCUMENTS 6502325 9/1965 Netherlands .
1408898 10/1975 United Kingdom .

Primary Examiner—Robert R. Song
Attorney, Agent, or Firm—Foley & Lardner, Schwartz, Jeffery, Schwaab, Mack, Blumenthal & Evans

[57] ABSTRACT

Tribune vehicle of the type that principally consists of a fixed floor which also forms the vehicle frame along which in the longitudinal direction of the vehicle and on both sides of it upright floor parts are provided which can be folded down to form a platform or tribune, characterized in that these floor parts can be placed on a different level in relation to the fixed floor part.

17 Claims, 6 Drawing Sheets

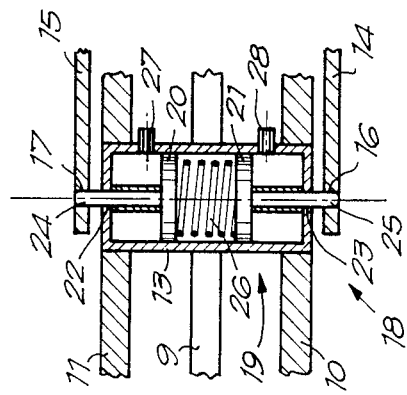
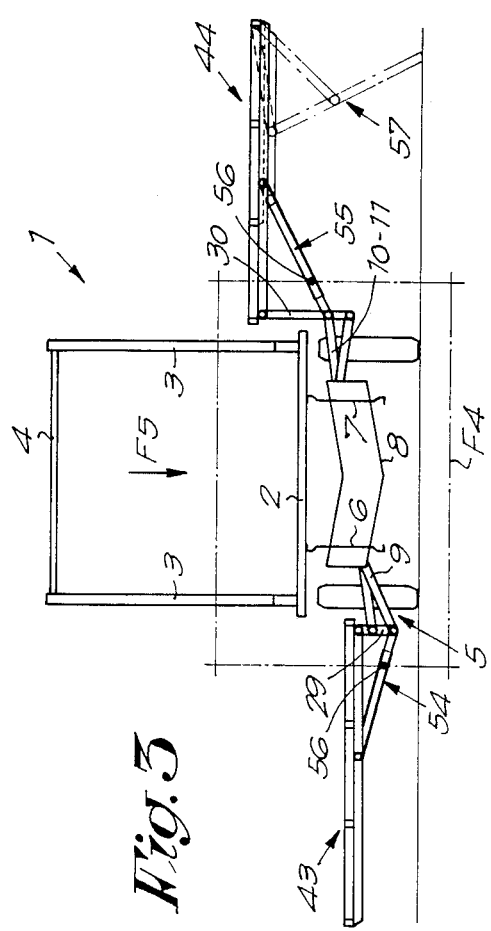

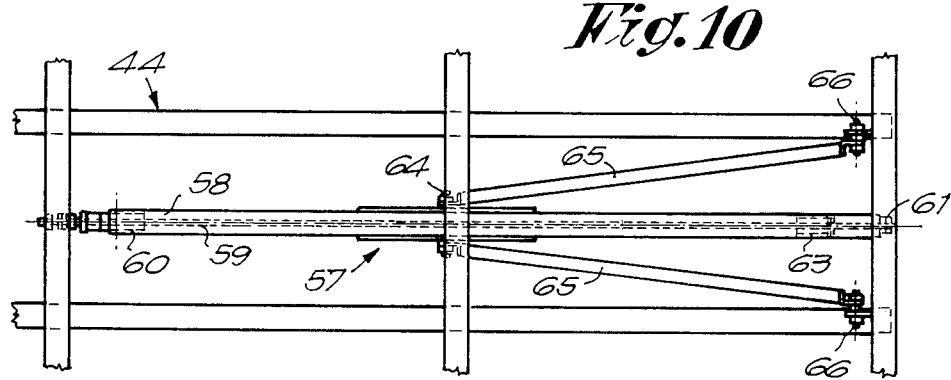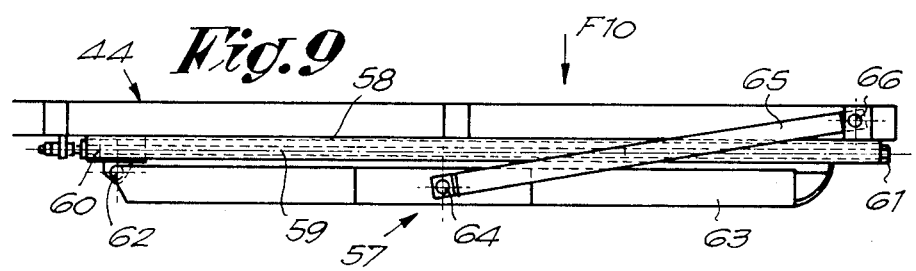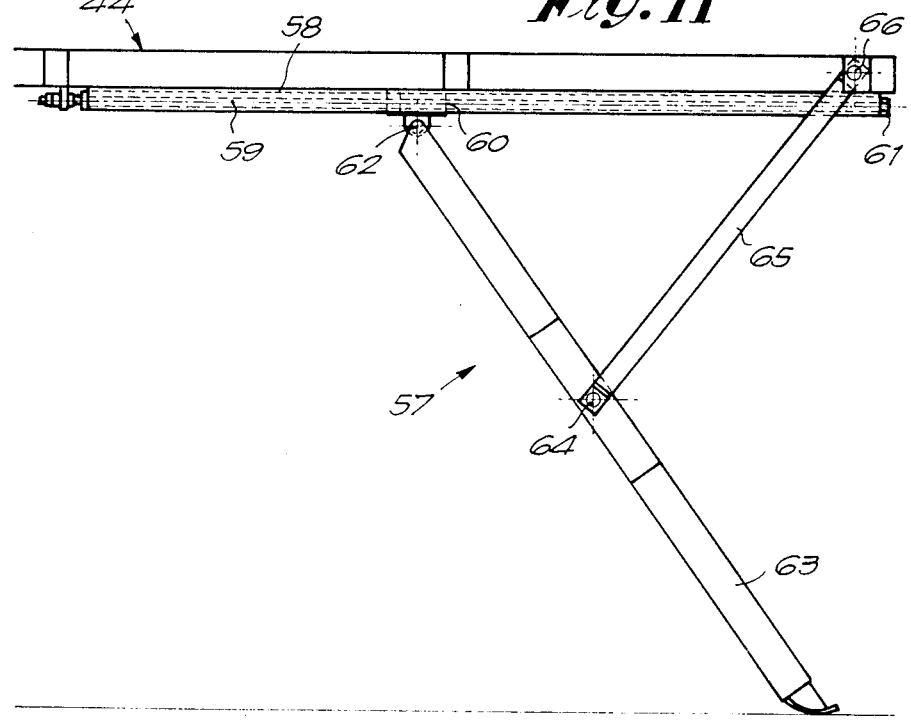

TRIBUNE VEHICLE

BACKGROUND OF THE INVENTION

1. Field of Invention

The present invention relates to a tribune vehicle, having a floor which is normally transportable on the road but of which a part is convertible, to a relatively large floor for a tribune on certain occasions. Such floor can be move, erected and disassembled in a simple manner.

2. Brief Description of Related Art

Such vehicles which can be built up as a tribune floor are already known, but the floor is always erected on a single level unless special arrangements are made. For example, unless fillings are provided, such as steps, in order thus to create differences in level on which the public can sit, with or without the use of benches, chairs or similar. The differences are intended so that the visibility for the people situated more to the back is almost as effective as for the people situated in front.

It is clear that the provision, and the placing and removal of the steps, is not only a costly affair, but also a time consuming occupation. These steps also occupy a large amount of space during transport.

OBJECTS AND SUMMARY OF THE INVENTION

The present invention relates to a tribune vehicle which totally excludes the aforementioned disadvantages of the known tribune vehicles. The inventions implemented so that a tribune vehicle can be formed in a simple and automatic manner, without intervention of means of assistance and which according to the necessities, can be divided into three different levels.

The tribune vehicle according to the invention of the type principally is comprised by a fixed floor which also forms the vehicle frame. Along the longitudinal direction and on both sides of the vehicle frame, upright floor parts are provided which can be folded down to form a platform or tribune. These floor parts can be placed on a different level in relation to the fixed floor part.

BRIEF DESCRIPTION OF THE DRAWINGS

The characteristics features and objects of the present invention may be more fully understood in reference to the enclosed drawings in which:

FIG. 3 is a view similar to that from FIG. 1 but with the tribune vehicle in position for use;

FIG. 6 shows a partial view according to arrow F6 in FIG. 1;

FIG. 7 shows a cross-section according to line VII—VII in FIG. 6;

FIG. 8 shows a view according to arrow F8 in FIG. 1;

FIG. 9 shows on larger scale a view of the part that is indicated by F9 in FIG. 3;

FIG. 10 shows a top view from FIG. 9;

FIG. 11 shows a view similar to that from FIG. 9 but whereby the supporting mechanism is shown in folded out position;

FIG. 12 shows a cross-section according to line XII—XII in FIG. 2.

DETAILED DESCRIPTION OF THE PREFERRED EMBODIMENT

Figure 1:
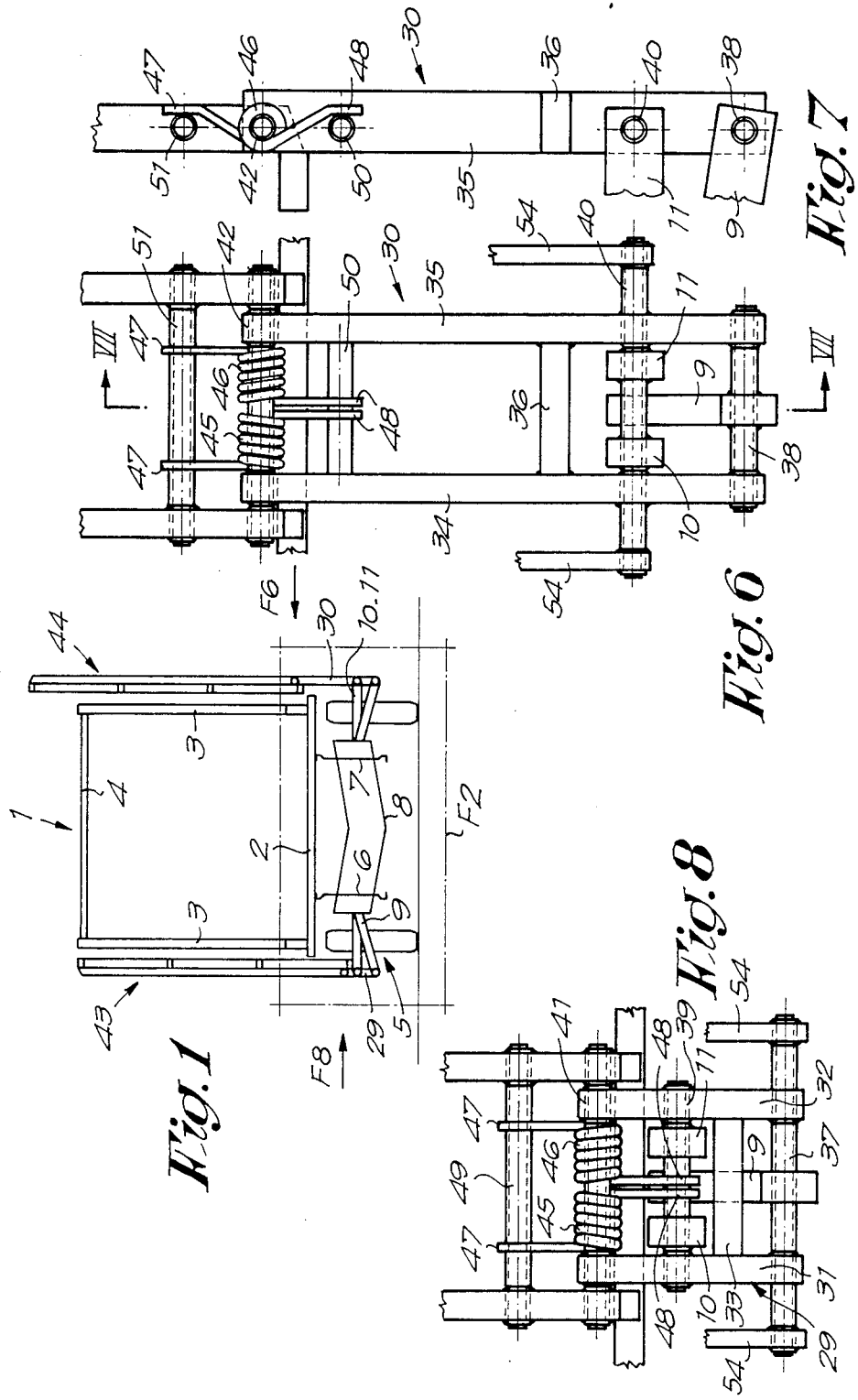
FIG. 1 shows a front view of a tribune vehicle according to the invention, whereby the tribune vehicle is in driving position.
Figure 2:
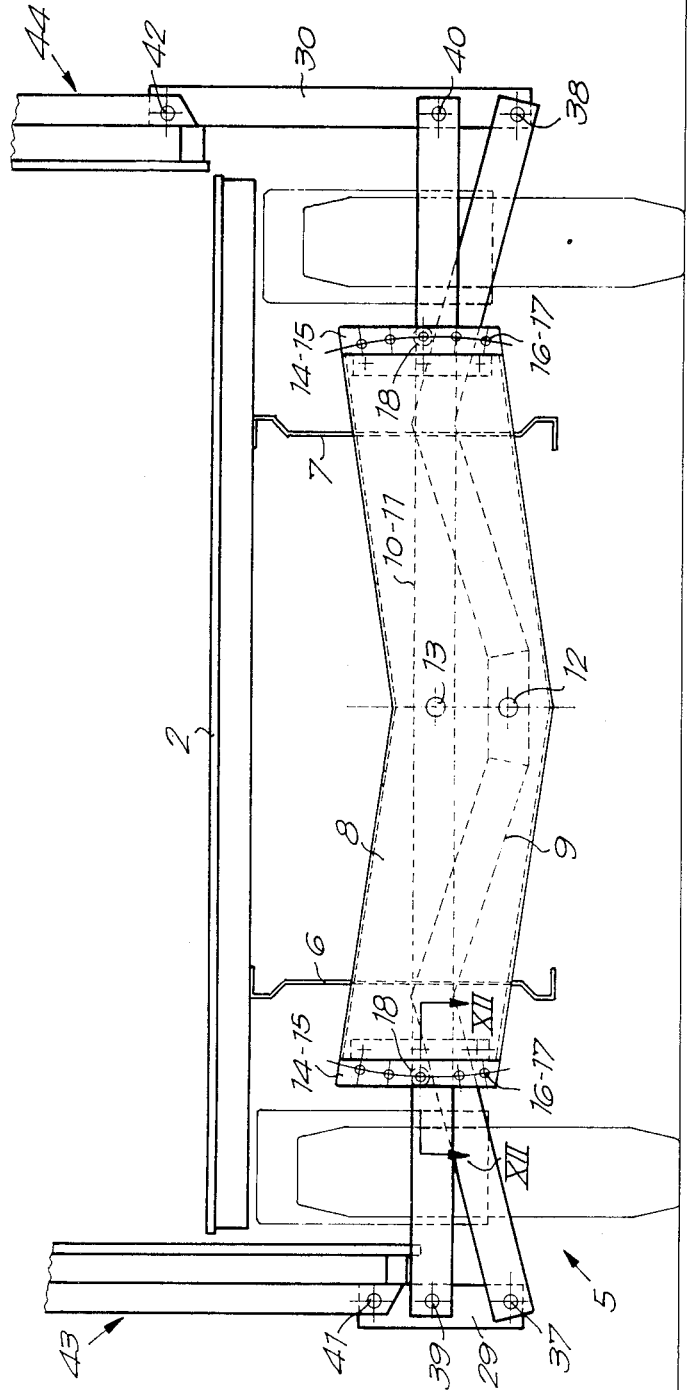
FIG. 2 shows on larger scale the part that is indicated by F2 in FIG. 1.

In the figures, a tribune vehicle 1 is shown in schematic manner and is comprised by a fixed floor 2 which also forms the vehicle frame and on which stanchions 3 are installed at suitable distances. The stanchions are connected to each other on top by supports 4 which can carry a roof construction not shown in the drawings.

The frame 2 rests on sets of wheels schematically indicated by 5 and is underneath, over the whole length strengthened by means of longitudinal girders 6-7.

Hollow transverse beams 8 are connected at three places. At these positions swing arms are also provided being respectively a single curved swing arm 9 and two straight swing arms 10 and 11 placed on either side of the swing arm 9.

Each swing arm 9 is suspended pivotally in its hollow transverse beam 8 by means of a shaft 12 while the each of swing arms 10 and 11 is suspended pivotally in their respective hollow transverse beam 8 by means of a common shaft 13.

On each free extremity of the hollow transverse beam 8, two lips 14-15 which contain several coaxially placed holes 16-17 in pairs.

In each hollow transverse beam extremity and between two swing arms 10-11 in the path of the series of holes 16-17 a device 18 is attached which principally consists of a housing 19 in which two pistons, respectively 20 and 21, are installed. The extremities of this housing 19 show passages, respectively 22 and 23, for bolt pins 24 and 25 which are installed on the pistons and can work together with a pair of holes 16-17 lying opposite each other.

Between the pistons 20 and 21 a spring 26 is provided which constantly attempts to push these pistons away from each other. In other words, the spring constantly attempts to bring the pins 24 and 25 into a pair of holes 16-17 in order to lock the swing arms 10 and 11 in a well defined position in relation to their hollow transverse beam 8. Between the end walls of the housing 19 and the outermost positions of the pistons 20 and 21 connections 27 and 28 are provided on the housing 19. These are connected in series to a hydraulic hand pump with which the vehicle is equipped.

Each hollow transverse beam 8 shows a V-shaped and the swing arms 9 show a double V-Shape so that the swinging of this arm 9 is possible without this touching the bottom of the hollow transverse beam 8.

Each swing arm 9 and the swing arm 10-11 belonging to it are each connected on both sides to a vertical support, respectively 29 and 30. The first vertical support is notably shorter than the second.

The suppot 29 is formed by two stanchions 31-32 which are connected to each other by a transverse piece 33. The support 30 is formed by two stanchions 34-35 which are connected to each other by means of a transverse piece 36.

Each swing arm 9 is pivotally connected on its extremity to the lower extremity of the supports 29 and 30 by means of a shaft, respectively 37-38. The swing arms 10 and 11 are likewise connected to the supports 29 and 30 by means of a common pivot, respectively 39 and 40. This connection is such a position that the distance between the shafts 37 and 39, and 38 and 40, are equal to the distance between the aforementioned shafts 12 and 13 in order thus to form a perfect parallelogram system.

A frame, respectively 43 and 44, is pivotally connected to the upper extremity of the supports 29 and 30 by means of a pivot, respectively 41 and 42.

Between the stanchions 31-32 and 34-35 of the supports 29 and 30, at least one torsion spring in this case two torsion springs per support 29-30, respectively 45-46 are installed on the pivot 41, respectively 42. The free extremities 47 and 48 of each of these torsion springs are supported behind stops which, in the case of a support 29, are formed by the shaft 39 and a transverse element 49 connected to the frame 43. These stops, in the case of a support 30, are formed by a transverse element 50 that is installed between the stanchions 34 and 35 of the support 30 and a transverse element 51 that constitutes one unit with the frame 44.

The torsion springs 45-46 are so placed that they compensate as effectively as possible for the weight of the frame 43, respectively 44. This compensation makes the downward movement of these frames 43-44 as simple as possible.

Figure 5:
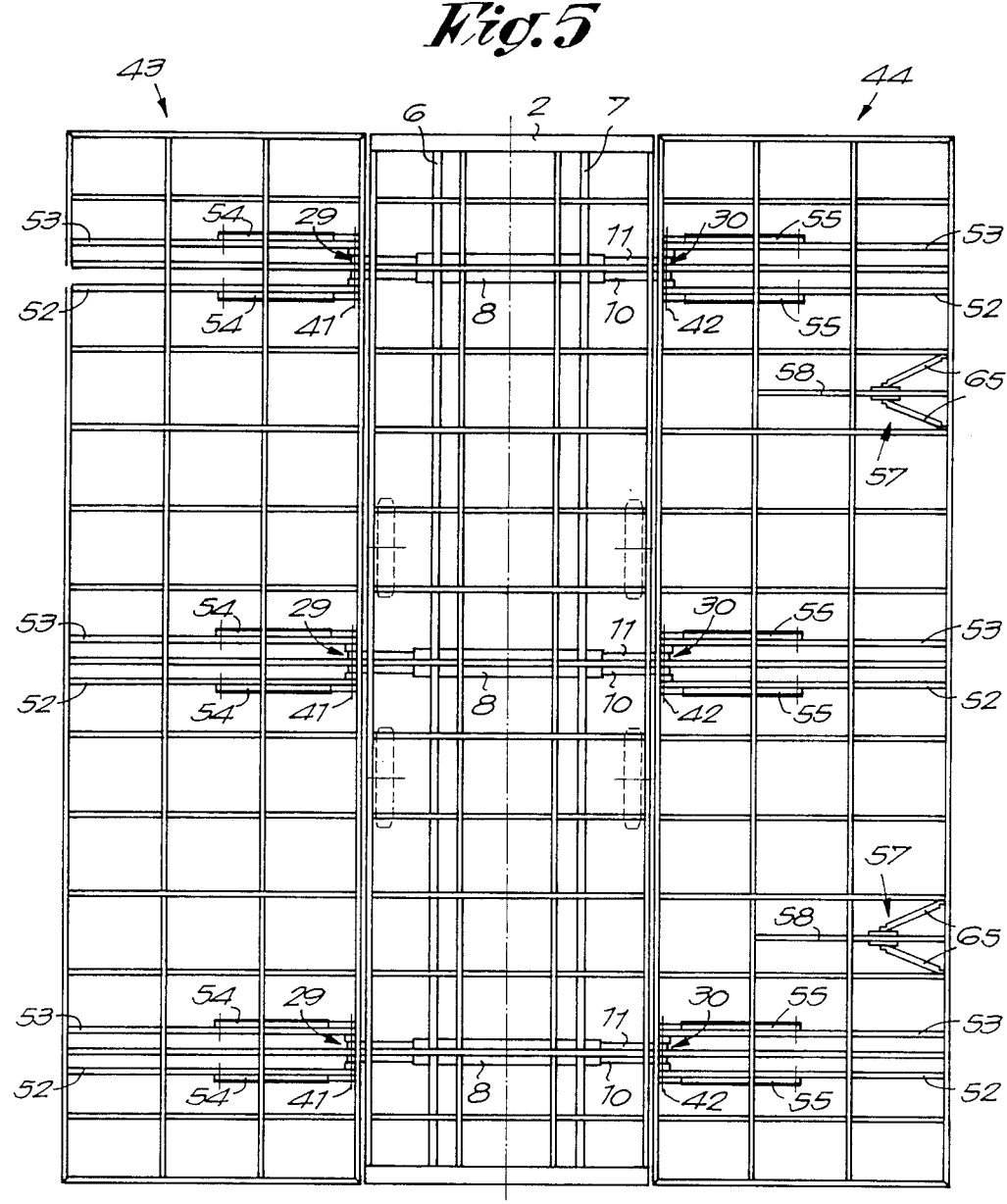
FIG. 5 shows a view according to arrow F5 in FIG. 3.

As is shown in FIG. 5, the frames 43 and 44 are formed by several transverse girders and longitudinal girders. In this embodiment, three supports 29 and three supports 30 are provided. There are two additional transverse girders 52-53 provided with the frame 43 and, respectively 44, per such support with which each frame as it were is pivotally attached to the aforementioned shafts 41 and 42.

Between each shaft 37 and 40 and the frame 43 and 44 two telescopic arms, respectively 54 and 55, are provided. In this embodiment these arms can automatically slide in and out, and the component parts can be locked in relation to each other in both the position as shown in FIG. 1 and in the position as shown in FIG. 3, for example, by installing a shaft or similar 56 through these parts. Although not shown in the drawings, such locking can be achieved by providing a passage in the outer part of a telescopic arm which works together with a passage of a series installed in the inner part of such telescopic arm.

Finally, still one or more additional supports 57 can be provided in order to support the frames 43 and/or 44 in the position according to FIG. 3. In this embodiment, such supports are only shown for the frame 44 but nothing prevents similar supports from being provided under the frame 43.

Support 57 is principally formed by an open tubular profile 58 that is attached under the frame and in which a screw spindle 59 is rotatably, but axially immovably installed. A nut 60 is provided on the spindle and cannot rotate in relation to the tubular profile 58, but can move in the latter along its longitudinal direction.

On the extremity directed toward the outer edge of the frame, the screw spindle 59 is further provided with means 61 with which the screw spindle can be driven. These means can, for example, be formed by a nut welded onto the screw spindle.

The extremity of a leg 63 which is rounded off on the free extremity, if freely and pivotally connected to the nut 60 by means of a shaft 62. This leg 63 is, by means of a shaft 64 also connected to a rod 65. Rod 65 is at its second extremity, connected to the frame, in this case the frame 44, by means of a shaft 66.

When the tribune vehicle described above must be moved along the road it is in the position as shown in FIG. 1.

When the vehicle to be transformed into a tribune at a certain place, the panels 43 and 44, which of course are each provided with a plank floor or similar not shown in the drawings, will be folded down against the resistance of the springs 45-46, after the bolt pins 56 have been removed. When the frames 43-44 are in the horizontal position the bolt pins 56 will be installed again in order to block these frames in their horizontal position.

At this moment, the two frames 42 and 44 are at a well defined level that is different from the level of the frame 2 of the tribune vehicle. When it is desired to alter these differences in level, it is sufficient to supply oil to the inlets 27 and 28 of each housing 19 such that the pistons 20 and 21 are moved toward each other, against the resistance of the spring 26, and the bolt pins 24-25 on each extremity of each transverse beam 8 are removed out of the holes 16-17 installed in their lips 14-15, such that the frames 43-44 can be moved in height simply by rotating the swing arms 9-10 and 11 around their turning points 12 and 13.

Figure 4:
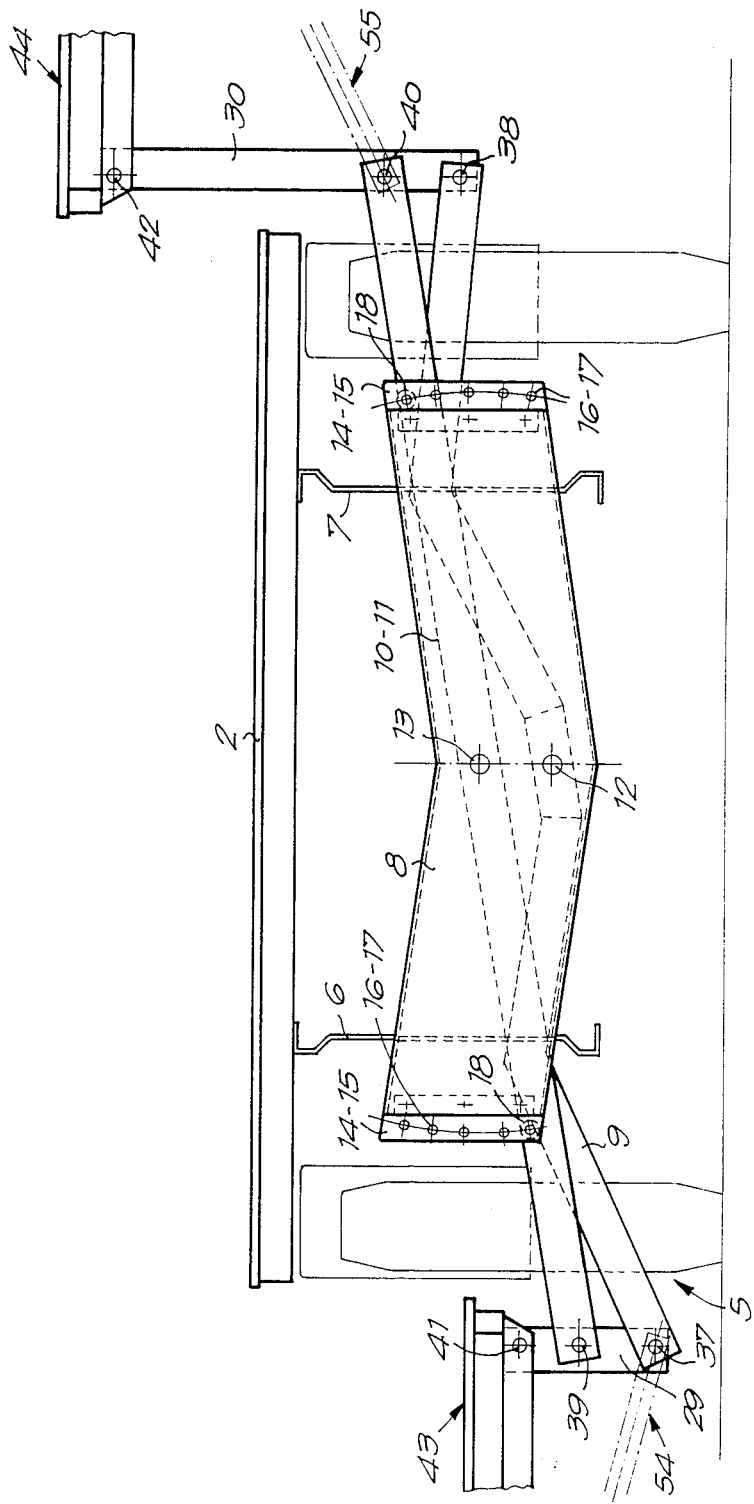
FIG. 4 shows on larger scale the part that is indicated by F4 in FIG. 3.

When the desired level adjustment of the frames 43 and 44 is obtained, the pressure between the extremities of each housing 19 and the pistons 20 and 21 will be removed so that the pins 24 and 25 can mesh with two pairs of holes 16-17 under influence of the spring 26. For example as shown in FIG. 4, the pins can mesh with the pairs of holes 16-17 which are provided on the bottom left and on the top right of the transverse beam 8.

Of course, for the adjustment of the heights of the frames 43 and 44, the rotation of these frames around the hinge points 12 and 13 can be effected only after folding these frames 43 and 44 down into the horizontal position.

When the tribune vehicle is brought into an aforementioned position, the legs 63, which are provided under the frame 44 and possibly under the frame 43, can be brought down to give additional support to such a frame.

This can be effected in a simple manner through rotating the screw spindle 59 by the nut or similar means and thus displacing the nut 60 over this screw spindle so that the leg 63 is moved downward until it reaches the ground.

In this manner a tribune vehicle is obtained with which it is possible in a simple manner to form a tribune floor with three parts situated on different adjustable levels.

It is obvious that the present invention is not limited to the embodiment described above and shown in the enclosed drawings. The above description and accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

I claim:

1. A tribune vehicle comprising:
a fixed floor forming a vehicle frame;

a pair of upright floor parts, positioned one on each side of the fixed floor and capable of being folded down to form a platform; and a means for operatively connecting one of the floor parts to the fixed floor for placing said one of the floor parts on a level higher than the fixed floor and for operatively connecting the other floor part to the fixed floor for placing the floor part on a level lower than the fixed floor when the pair of floor parts are folded down to form a platform.

2. A tribune vehicle according to claim 1, wherein the connection means comprises a pair of vertical supports attached at a free upper extremity to the floor parts and pivotally joined at a bottom end by a parallelogram system pivotally suspended from the fixed floor.

3. A tribune vehicle according to claim 2, wherein the supports have different lengths.

4. A tribune vehicle according to claim 2, wherein the parallelogram system is pivotally suspended in a hollow transverse beam of the fixed floor.

5. A tribune vehicle according to claim 4, wherein the hollow transverse beam is attached to a plurality of longitudinal girders supporting the fixed floor.

6. A tribune vehicle according to claim 2, wherein the parallelogram system comprises a pair of swing arms.

7. A tribune vehicle according to claim 6, wherein one swing arm has two members and the other swing arm is positioned between the two members.

8. A tribune vehicle according to claim 6, including a V-shaped hollow transverse beam, and one of the swing arms having a double V-shape.

9. A tribune vehicle according to claim 4, wherein the hollow transverse beam has a pair of free extremities having lips thereon, the lips each having a plurality of paired coaxially placed holes.

10. A tribune vehicle according to claim 9, wherein a gripping device is provided on a first swing arm and cooperating with the coaxially placed holes.

11. A tribune vehicle according to claim 4, wherein a plurality of hollow transverse beams are provided at regular intervals from each other along a longitudinal axis of the floor.

12. A tribune vehicle according to claim 2, wherein a locking means is provided between the vertical supports and the floor parts for locking the floor parts in successive positions.

13. A tribune vehicle according to claim 2, including at least one additional support provided on a free edge of at least one of the floor parts.

14. A tribune vehicle according to claim 12, wherein the locking means comprises a telescopic arm, parts of the arm being relatively slidable and being locked in a plurality positions relative to each other.

15. A tribune vehicle according to claim 2, including at least one torsion spring being provided between each floor part and each vertical support.

16. A tribune vehicle according to claim 15, wherein the torsion spring compensates for weight of the floor part.

17. A tribune vehicle according to claim 10, wherein the gripping device comprises a housing attached to the parallelogram system; and including a pair of pistons being mounted externally on housing pins and working with the coaxially placed holes in the transverse beam; a spring positioned between the pistons; and connections for oil pressure between the housing and each piston.

* * * * *